(12) United States Patent
Zuniga Lara

(10) Patent No.: US 12,286,989 B2
(45) Date of Patent: Apr. 29, 2025

(54) SALT-CELLAR-LIKE DEVICE FOR INCREASING PRESSURE

(71) Applicant: Ricardo Isidro Zuniga Lara, Queretaro (MX)

(72) Inventor: Ricardo Isidro Zuniga Lara, Queretaro (MX)

(*) Notice: Subject to any disclaimer, the term of this patent is extended or adjusted under 35 U.S.C. 154(b) by 320 days.

(21) Appl. No.: 17/905,841

(22) PCT Filed: Mar. 26, 2021

(86) PCT No.: PCT/MX2021/050016
§ 371 (c)(1),
(2) Date: Sep. 8, 2022

(87) PCT Pub. No.: WO2022/093001
PCT Pub. Date: May 5, 2022

(65) Prior Publication Data
US 2023/0118270 A1    Apr. 20, 2023

(30) Foreign Application Priority Data
Oct. 30, 2020    (MX) .................. MX/u/2020/000513

(51) Int. Cl.
*F15D 1/02*    (2006.01)
(52) U.S. Cl.
CPC .................................. *F15D 1/025* (2013.01)
(58) Field of Classification Search
CPC ....................................................... F15D 1/025
USPC .......................................................... 138/44
See application file for complete search history.

(56) References Cited

U.S. PATENT DOCUMENTS

| | | | | |
|---|---|---|---|---|
| 2,631,659 A * | 3/1953 | Wright | .................... | F23D 14/48 239/431 |
| 5,315,859 A * | 5/1994 | Schommer | ................ | F15D 1/00 73/1.25 |
| 6,390,134 B1 * | 5/2002 | Hanby | ..................... | B23K 9/32 138/44 |
| 8,567,446 B1 * | 10/2013 | Crompton | ............... | F16K 17/34 285/123.3 |
| 8,950,435 B2 * | 2/2015 | Lin | ......................... | E03C 1/084 137/833 |
| 10,619,656 B1 * | 4/2020 | Handley | ................. | F23K 5/002 |

(Continued)

FOREIGN PATENT DOCUMENTS

| | | |
|---|---|---|
| CN | 110813570 | 2/2020 |
| ES | 1025683 | 1/1994 |

(Continued)

*Primary Examiner* — David R Deal
(74) *Attorney, Agent, or Firm* — Defillo & Associates, Inc.; Evelyn A. Defillo

(57) ABSTRACT

A device that serves to increase the pressure on the outlets of water intakes in houses or gardens. This system to increase the water pressure is called salt-cellar-like device for increasing pressure. The salt-cellar-like device for increasing pressure has 6 external walls that give its body a hexagonal shape. These external walls allow the device to be held firmly by some tool that rotates the device, so that it is correctly inserted and attached to some water intake. The salt-cellar-like device for increasing pressure has a head that has a circular concavity on its upper part, as well as on the surface of this circular concavity there is an arrangement of conduits from which the water leaves the device to a higher pressure.

3 Claims, 6 Drawing Sheets

(56) References Cited

U.S. PATENT DOCUMENTS

| | | | | |
|---|---|---|---|---|
| 2013/0025719 A1* | 1/2013 | Yang | ................. | G05D 7/012 |
| | | | | 137/599.01 |
| 2013/0037153 A1* | 2/2013 | Schommer | ............. | E03C 1/08 |
| | | | | 138/44 |
| 2013/0081730 A1* | 4/2013 | Schwartz | .............. | F15D 1/02 |
| | | | | 138/44 |
| 2018/0085764 A1* | 3/2018 | Klassen | ............... | B05B 1/002 |
| 2023/0146097 A1* | 5/2023 | Ruiz | .................. | F28F 9/028 |
| | | | | 138/40 |

FOREIGN PATENT DOCUMENTS

| | | |
|---|---|---|
| JP | 2011172892 | 9/2011 |
| JP | 2011183125 | 9/2011 |
| KR | 101581391 | 12/2015 |

\* cited by examiner

SALT-CELLAR-LIKE DEVICE FOR INCREASING PRESSURE

CROSS REFERENCE TO RELATED APPLICATION

This application is a national stage entry of PCT/MX2021/050016 filed Mar. 26, 2021, under the International Convention and claiming priority over Mexican Patent Application No. MX/u/2020/000513 filed Oct. 30, 2020.

FIELD OF THE INVENTION

The present invention is a device that serves to increase the pressure on the outlets of water intakes in houses or gardens.

BACKGROUND OF THE INVENTION

There are places where the water pressure is very low so that the liquid flows from the initial point to the desired point, for example, in a house, the water that flows from the cistern to the irrigation system, in many cases, it does not reach the final outlet, because there is not enough pressure to spray the water evenly.

Another example is in gardens where a hose is used to water the garden, but if the hose has a large length, the water pressure decreases at the moment when the water reaches the end of the hose.

There are some elements to increase the pressure that are used in the current water network as it can be a pressure pump. In some other cases, it is possible to increase the diameter of the tube so that more liquid arrives at the destination point. It is common to find pressurization kits on the market that, just like pumps, require a professional connection to the pipe network.

In the case of gardens or sprinklers, there are many types of nozzles that are placed to increase the pressure and choose the type of spray to be applied.

TECHNICAL PROBLEM TO BE SOLVED

We are looking to have a device that can be used with irrigation and any water intake that allows the user to increase the pressure without the need of electrical energy and with the possibility that it can be a final or intermediate connection, the user can decide either to have an after connection as a mouthpiece for watering the garden or a common irrigation system that sprays the water to reach the needs of the user.

BRIEF DESCRIPTION OF THE INVENTION

The salt-cellar-like device for increasing pressure is an element that has a body of 6 sides, a circular type inlet hole, with an internal thread that is screwed into the water inlets; There is a head with an external thread where you can place some other element for water dispersion. The interior where the water passes has a conical fitting and a water outlet hole that allows the water to spray with greater pressure than the one it had when entering the device.

DETAILED DESCRIPTION OF THE INVENTION

Figure 1:
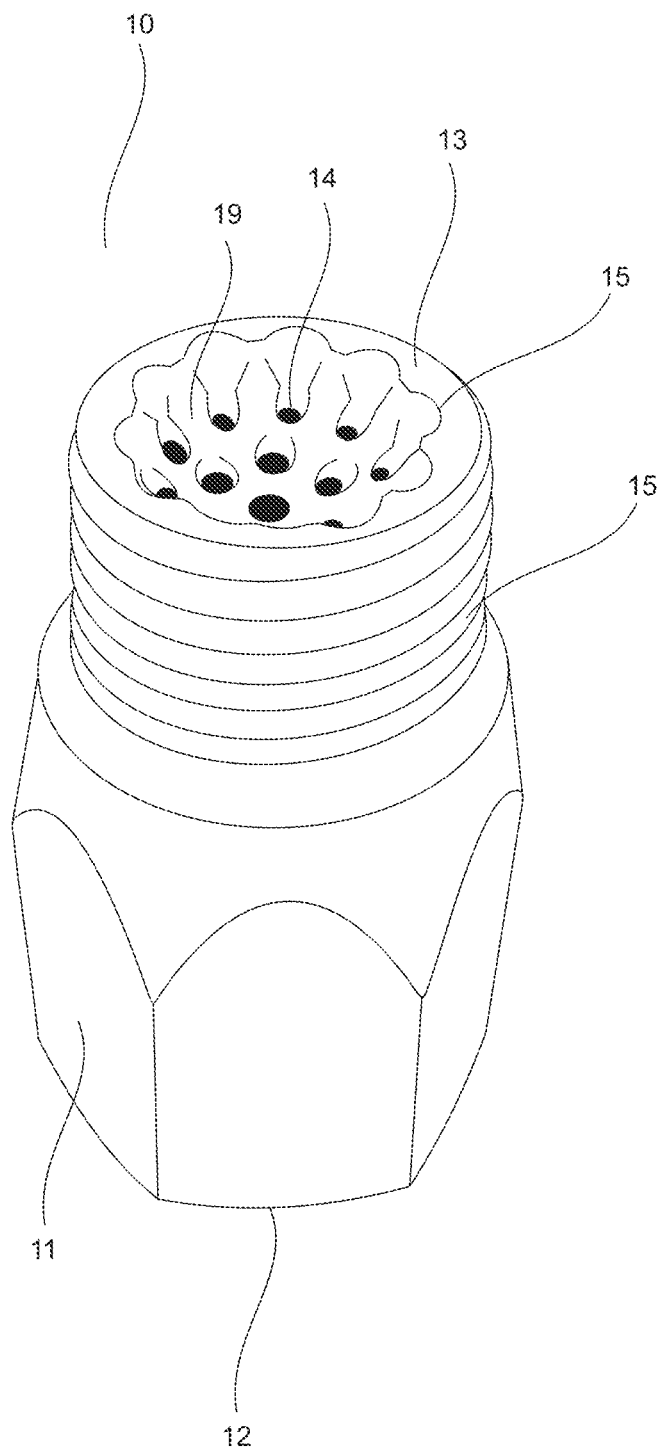
FIG. 1. Shows the perspective view of a salt-cellar-like device for increasing pressure.
Figure 2:
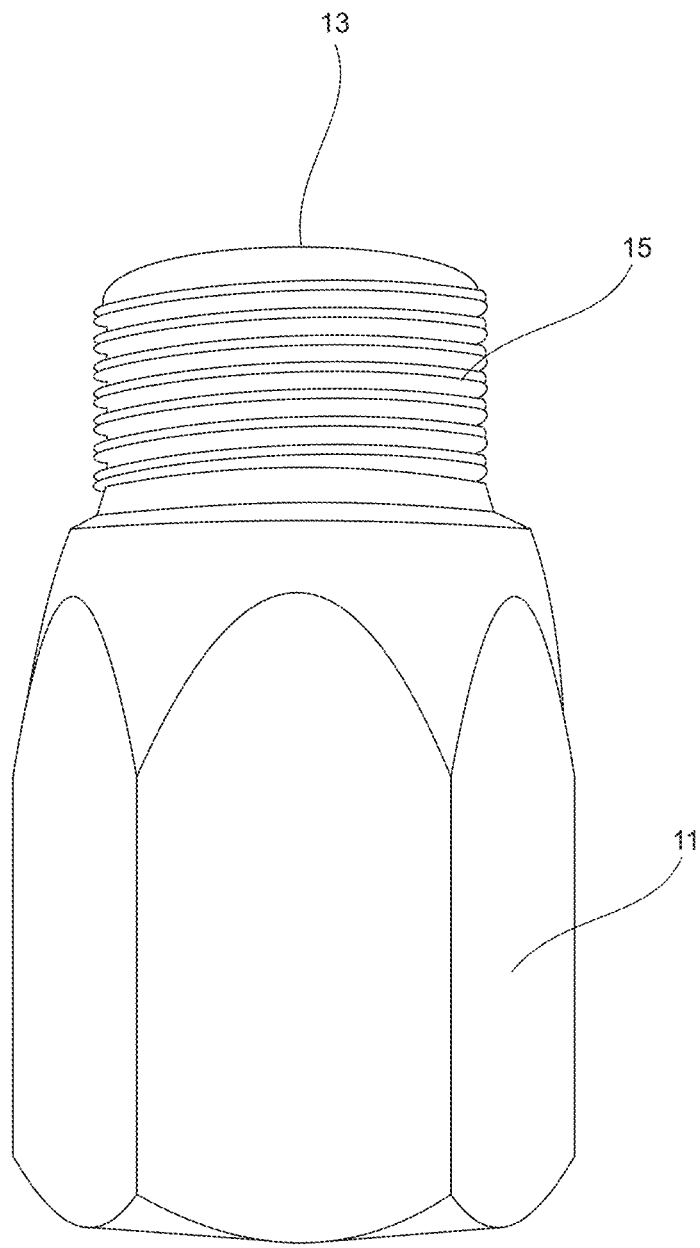
FIG. 2. Shows the front view of a salt-cellar-like device for increasing pressure.
Figure 3:
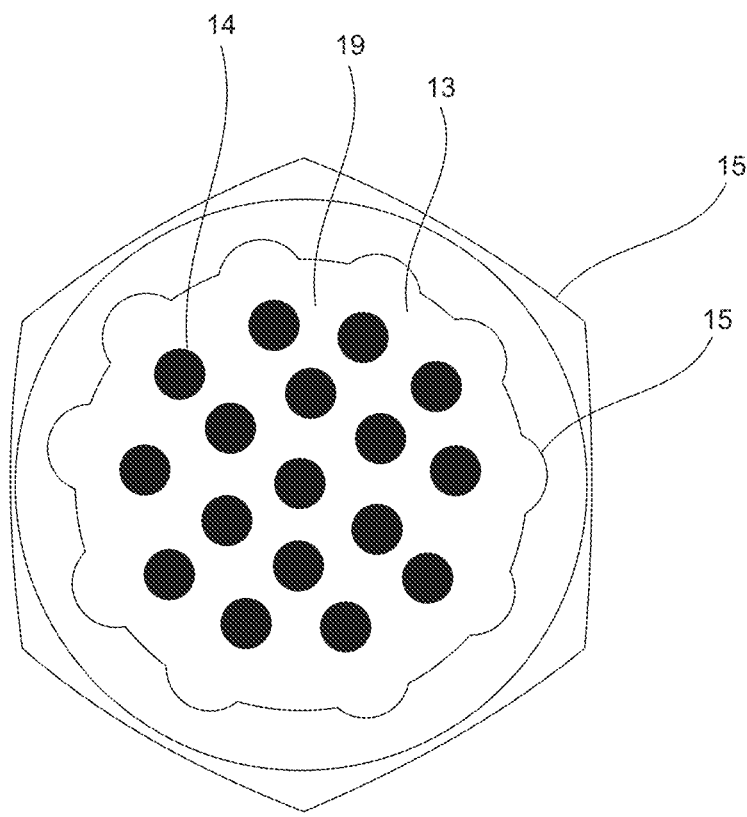
FIG. 3. Shown the bottom view of the salt-cellar-like device for increasing pressure.
Figure 4:
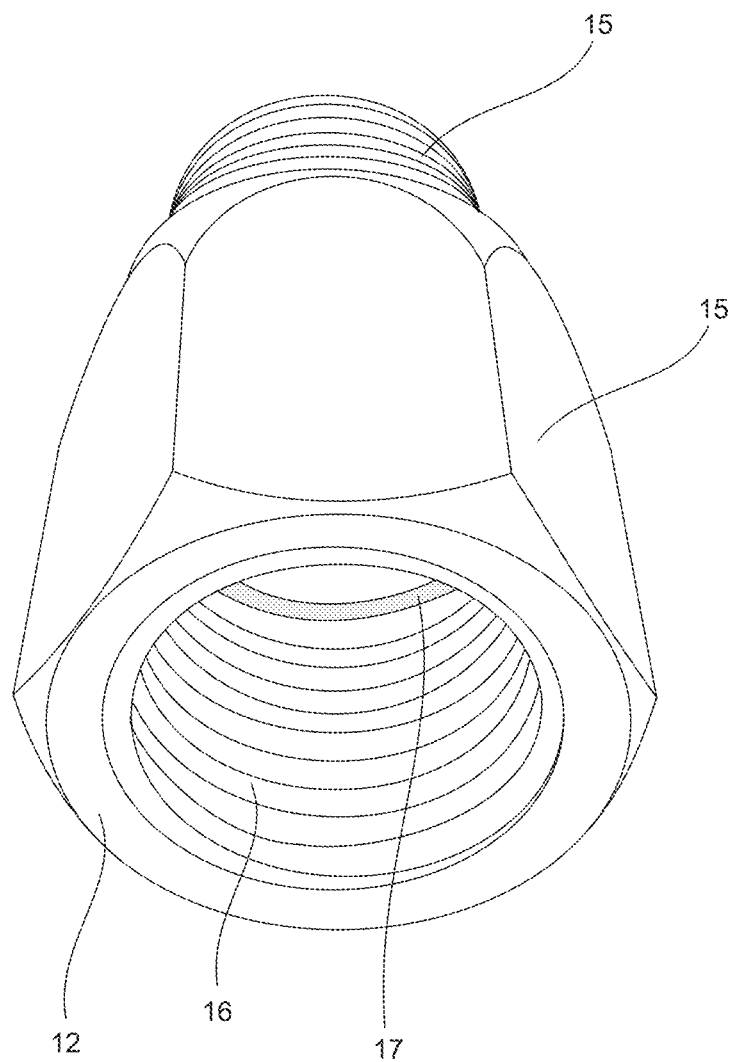
FIG. 4. Shown the bottom view and in perspective of the salt-cellar-like device for increasing pressure.
Figure 5:
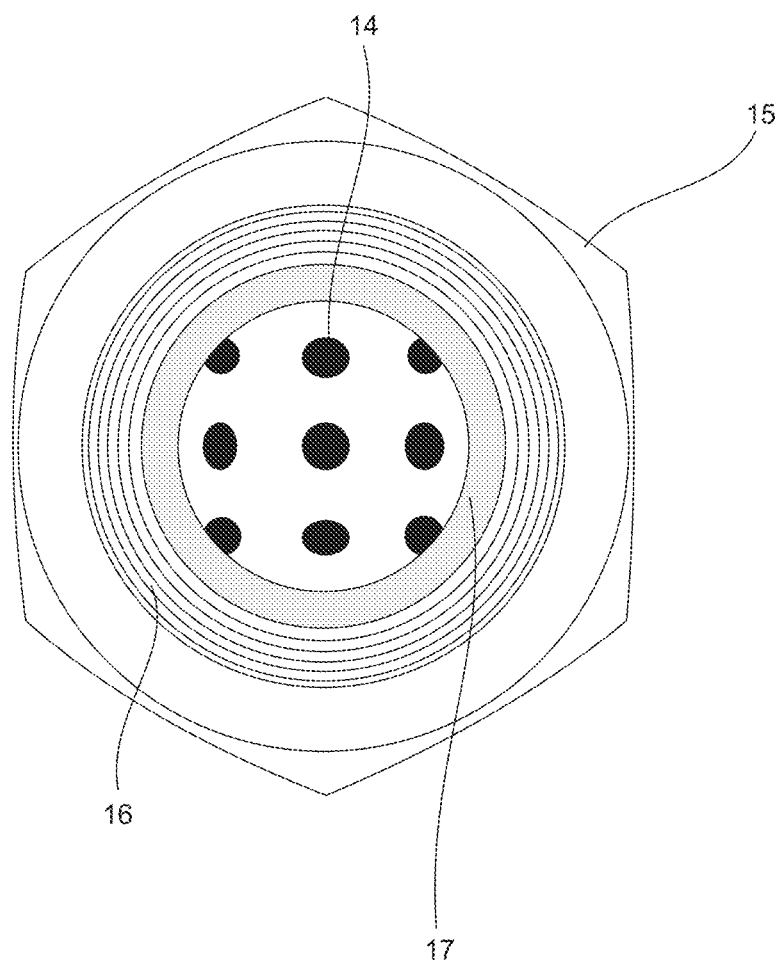
FIG. 5. Shown the top view of the salt-cellar-like device for increasing pressure.
Figure 6:
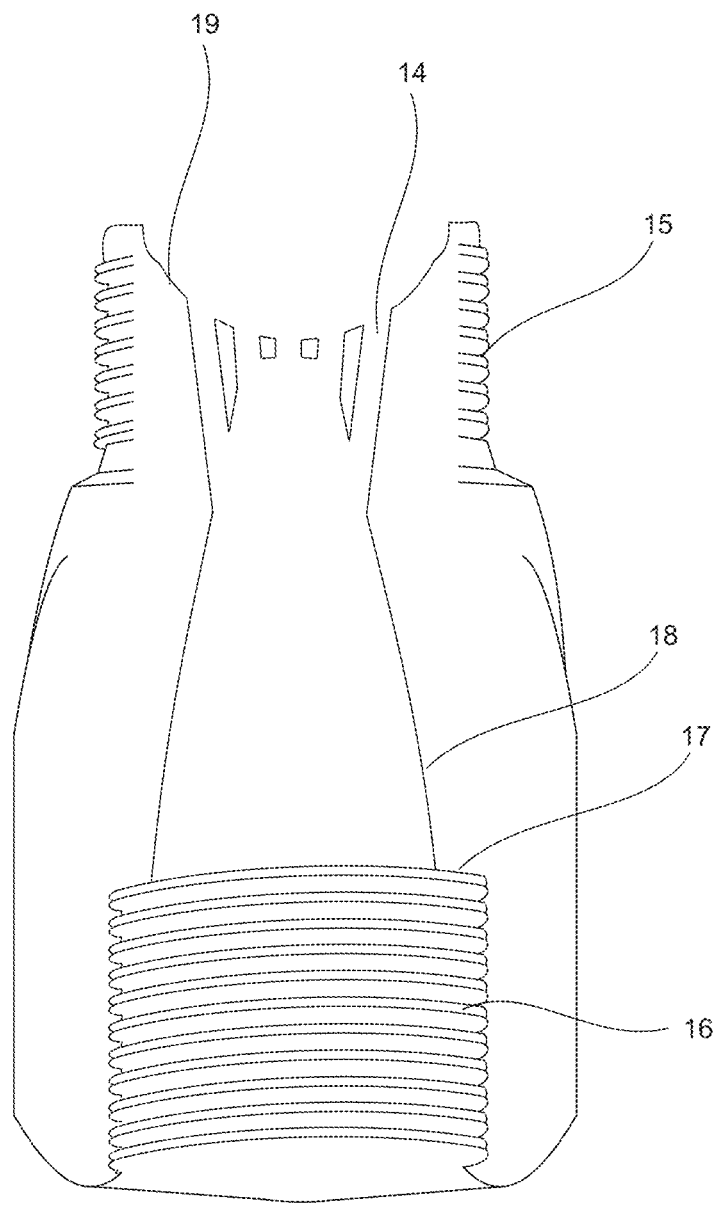
FIG. 6. Shows a front cut view of the salt-cellar-like device for increasing pressure that allows to appreciate the internal arrangement of the device.

The present invention consists of a device that increases the water pressure without the need for electrical energy. This system that increases the water pressure is called salt-cellar-like device for increasing pressure.

The salt-cellar-like device for increasing pressure (10) has 6 external walls (11) that gives it a hexagonal shape. These external walls (11) allow the device to be firmly held by a tool that rotates the salt-cellar-like device for increasing pressure (10), so that it can be inserted and correctly attached to any faucet or water pipe.

The salt-cellar-like device for increasing pressure (10) has a head (13) with a circular concavity (19) on its upper surface, likewise on the surface of this circular concavity (19) there is an arrangement of exit conduits (14) from where the water leaves the device at higher pressure. The body of the head (13) is cylindrical and it also has an external thread (15) where you can place some additional connection to disperse the water.

The salt-cellar-like device for increasing pressure (10) has an inlet mouth (12). On the interior wall of the inlet mouth (12) there is an internal thread (16) that serves to get the device stuck in the pipe where it is desired to increase the pressure, for example, in a water pipe or faucet. At the end of the internal thread there is an insertion stop (17) which consists of a reduction of the internal diameter and determines the end of the internal thread (16). The insertion stop (17) has as its purpose limiting the entrance of the water pipe up to that part and concentrating the water to the pressure cone (18).

The pressure cone (18) is a diameter reduction through which the water passes, which allows for increasing the pressure of the liquid. At the end of the pressure cone (18) the exit conduits (14) are found to be oriented and with an inclination towards the most reduced point of the pressure cone (18). For the correct functioning of the salter-type water pressurizing device (10), it is important that the exit conduits (14) are not parallel.

The invention claimed is:

1. A salt-cellar-like device for increasing pressure (10) comprising:
    a body with six walls (11) and having a hexagonal shape,
    a head (13),
    an internal thread (16), and
    a pressure cone (18) that allows the water to flow from a larger diameter area to a smaller diameter area;
    exit conduits (14) located in the smaller diameter area of the pressure cone (18); and
    wherein the exit conduits include nine exit conduits (14), of which a central exit conduit (14) is perpendicular while the remaining exit conduits (14) are not parallel to each other and have an inclination that brings them closer as they approach the pressure cone (18) and separates them as they approach the upper part of the head (13).

2. The salt-cellar-like device for increasing pressure (10), according to claim 1, wherein the head (13) contains an external thread (15).

3. The salt-cellar-like device for increasing pressure (10), according to claim 1, wherein the head (13) contains a circular concavity (19) with an external thread (15).

\* \* \* \* \*